(12) United States Patent  
Manica et al.

(10) Patent No.: US 6,463,126 B1
(45) Date of Patent: Oct. 8, 2002

(54) METHOD FOR QUALIFYING A LOOP FOR DSL SERVICE

(75) Inventors: David M. Manica, Lafayette, CO (US); Mark B. Edwards, Highlands Ranch, CO (US); Richard L. Gibson, Ellston, IA (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 09/435,500

(22) Filed: Nov. 6, 1999

(51) Int. Cl.[7] .......................... H04M 1/24; H04M 3/08; H04M 3/22
(52) U.S. Cl. ................ 379/27.01; 379/1.04; 379/15.03; 379/22.04
(58) Field of Search .............................. 379/1.04, 15.03, 379/22.01, 22.02, 22.04, 24, 27.01, 27.02, 27.03, 30, 32.04

(56) References Cited

U.S. PATENT DOCUMENTS

| | | |
|---|---|---|
| 4,791,659 A | 12/1988 | Ross |
| 5,166,925 A | 11/1992 | Ward |
| 5,559,854 A | 9/1996 | Suzuki |
| 5,784,558 A | 7/1998 | Emerson et al. |
| 5,793,751 A | 8/1998 | Baker et al. |
| 5,883,883 A | 3/1999 | Baker et al. |
| 5,892,756 A | 4/1999 | Murphy |
| 5,909,445 A | 6/1999 | Schneider |
| 5,991,270 A | 11/1999 | Zwan et al. |
| 6,002,671 A | 12/1999 | Kahkoska et al. |
| 6,014,425 A | 1/2000 | Bingel et al. |
| 6,058,162 A | 5/2000 | Nelson et al. |
| 6,091,713 A | 7/2000 | Lechleider et al. |
| 6,209,108 B1 * | 3/2001 | Pett et al. |
| 6,266,395 B1 * | 7/2001 | Liu et al. |
| 6,278,769 B1 * | 8/2001 | Bella |

OTHER PUBLICATIONS

International Search Report—Apr. 18, 2000.
International Search Report—Apr. 26, 2000.
International Search Report—May 15, 2000.
U.S. patent application Ser. No. 09/435,954, filed Nov. 9, 1999, David M. Sanderson.
U.S. patent application Ser. No. 09/448,669, filed Nov. 24, 1999, John T. Pugaczewski.

* cited by examiner

Primary Examiner—Duc Nguyen
(74) Attorney, Agent, or Firm—Brooks & Kushman P.C.

(57) ABSTRACT

A method for qualifying a local loop for DSL service identifies the loop on an individual basis with respect to a plurality of other loops, while determining a qualification result based on descriptive data and a different data source as dictated by the state of the description data. The method includes determining an end to end path that individually identifies the loop, gathering descriptive data, and determining the qualification result. The qualification result is based on the descriptive data and further based on the different data sources dictated by the state of the set of loop description data.

15 Claims, 5 Drawing Sheets

METHOD FOR QUALIFYING A LOOP FOR DSL SERVICE

TECHNICAL FIELD

The present invention relates to a method for qualifying a local loop for digital subscriber line (DSL) service.

BACKGROUND ART xDSL is a generic term for digital subscriber line equipment and services, including packet-based architectures, such as ADSL, HDSL, SDSL, IDSL VDSL, and RADSL. DSL technologies provide extremely high bandwidth over embedded twisted pair, copper cable plant. DSL technologies offer great potential for bandwidth-intensive applications.

ADSL or asymmetric digital subscriber line services generally use existing unshielded twisted pair (UTP) copper wires from the telephone company's central office to the subscriber's premise. ADSL modems at both the central office and the subscriber's premise send high-speed digital signals up and down the copper wires. The ADSL flavor of DSL services is capable of providing a downstream bandwidth of about 1.5 Mbps–6.144 Mbps, and an upstream bandwidth of about 32 Kbps–640 Kbps with loop distances ranging from about 3.7 km–5.5 km.

HDSL or high bit rate digital subscriber line services provide a symmetric, high-performance connection over a shorter loop, and typically require two or three copper twisted pairs. HDSL is capable of providing both upstream and downstream bandwidth of about 1.5 Mbps, over loop distances of up to about 3.7 km. SDSL or single line digital subscriber line services provide a symmetric connection that matches HDSL performance using a single twisted pair, but operating over a shorter loop of up to about 3.0 km. VDSL or very high bit rate digital subscriber line services are typically implemented in asymmetric form, as a very high speed variation on the ADSL theme over a very short loop. Specifically, target downstream performance is typically about 52 Mbps over UTP local loops of 300 m, 26 Mbps at 1,000 m, and 13 Mbps at 1,500 m. Upstream data rates in asymmetric implementations tend to range from about 1.6 Mbps to about 2.3 Mbps. Additionally, there is RADSL or rate adaptive asymmetric digital subscriber line services. RADSL provides a dynamic connection that adapts to the length and quality of the line.

In the DSL family of services, many DSL themes, including ADSL, HDSL, SDSL, IDSL, VDSL, and RADSL, utilize a packet-based approach that does away with the line-grabbing practice of circuit switched networks, such as ISDN (although ISDN service is a form of digital subscriber line). This packet-based approach is very advantageous in a variety of situations. IDSL provides a bandwidth of 128 Kbps and terminates on the customer side at an ISDN terminal adapter.

Of course, DSL services, also commonly referred to as simply DSL or digital subscriber line services, are much more dependent on line conditions than traditional telephone services. Traditional telephone services typically use a bandwidth including frequencies up to about 4 kilohertz, while the DSL services utilize a bandwidth including frequencies sometimes over 1 MHz. While some local loops are in great condition for implementing DSL services, that is, the local loops have short to moderate lengths with minimal bridged taps and splices, many local loops are not as clean. For example, local loop length varies widely, for example, from as short as a few hundred meters to as long as several kilometers.

Further, the wire gauge for a local loop is almost always not continuous over the length of the loop. That is, a portion of the local loop may be one wire gauge, while an adjacent portion of the local loop has a different wire gauge, with the two portions being spliced together. Still further, many existing local loops have one or more bridged taps. A bridged tap is a length of wire pair that is connected to a loop at one end and is unterminated at the other end. Sometimes, an existing local loop will have several bridged taps so that the telephone company may connect a customer to any one of the taps (while leaving the other taps unterminated). Tapped lines may allow the telephone company to better utilize its copper cable plant distribution. For example, a particular service area may include 25 residences. Because not all residences require multiple phone lines, there may be a total of about 30 or 35 local loops, with some of the loops having multiple bridged taps. As such, it may be possible for any one of the residences to order multiple line service, so long as only a few of the residences do so.

Because so many different factors affect the success of a DSL solution, the question of whether or not a particular local loop qualifies for any level of DSL service is a complicated one. Due to varying line conditions, some loops may qualify for the highest quality DSL service, while other loops only qualify for a very limited bandwidth, and still, some of the loops do not qualify at all for DSL service. The steps involved in determining the quality of DSL service that is available on a particular loop is called the loop qualification process. In an existing loop qualification process, a customer calls a DSL service provider and inquires as to the availability of DSL service. The customer service representative then performs a database look-up on the customer's line and evaluates the ability to receive DSL service. The database record indicates line quality on an aggregate basis. That is, a record may generally indicate the conditions of all lines in a medium sized group of lines. If the customer service representative believes that further inquiry is required, he/she may test the circuit with voice band measurement devices.

Unfortunately, the accuracy of some database records is questionable and it has been found that line quality may vary widely even among lines in the same medium sized group. Further, voice band measurements do not always accurately reflect the ability of a loop to support DSL services. As such, many times the customer cannot know the actual available bandwidth for DSL services until after customer premise equipment has been purchased and installed at the customer residence. If, after several steps have been taken to implement a DSL solution, it is then determined that the local loop is in such poor condition that DSL cannot be supported or that the local loop does not support as much bandwidth as the customer anticipated, there can be a lot of disappointment for both the customer and the service provider.

For the foregoing reasons, there is a need for a method that allows a customer to determine whether or not a local loop is capable of receiving DSL service that overcomes the limitations associated with the prior art.

DISCLOSURE OF INVENTION

It is, therefore, an object of the present invention to provide a loop qualification tool and method for DSL service that qualifies the loop on an individual basis and, as appropriate, uses data from multiple sources.

In carrying out the above object, a method for qualifying a local loop for a digital subscriber line service is provided. The loop has a provider end and a customer end. The method comprises determining a provider end to customer end path for the local loop. The end to end path identifies the loop on an individual basis with respect to a plurality of other loops. The method further comprises determining a set of loop description data, identifying a state of the set of loop description data, and determining a qualification result for the local loop. The set of loop description data corresponds to the end to end path of the local loop. The qualification result is based on the set of loop description data and is further based on a different data source as dictated by the state of the set of loop description data. That is, the loop is qualified on an individual basis, and as appropriate multiple information sources are checked to qualify the loop.

Embodiments of the present invention may be suitable for a number of different digital subscriber line (DSL) applications. The inventors believe that embodiments of the present invention are suitable for carrierless amplitude phase (CAP) line encoding and rate adaptative asymmetric digital subscriber line (RADSL) applications. Of course, embodiments of the present invention may be suitable for other applications, such as discrete multi-tone (DMT) line encoding DSL applications. Further, it is appreciated that embodiments of the present invention may be suitable for many DSL solutions including, for example, ADSL, HDSL, SDSL, IDSL, ISDN, VDSL, and RADSL, and solutions utilizing various portions of the frequency spectrum in various ways.

In one embodiment, determining the provider end to customer end path further comprises accessing a loop facilities assignment system. The system has records indicating the end to end paths for the loops. In one embodiment, determining the set of loop description data further comprises accessing a physical description database having records indicating the loop description data. The loop description data for a loop may include lots of different information. For example, wire gauge information, bridged tap information, segment information and load coil information are all examples of information that may be included in the loop description data, on an individual loop basis. Further, the loop description data may include an identifier indicating a state from a plurality of states including an actual state and a planned state for the data. As such, in some embodiments, the qualification result is further based on the different data source when the identifier indicates a planned state. Actual data should not require multiple data sources.

The different data source may be, for example, loop test data corresponding to the end to end path of the local loop. The test data could be based on capacitance measurements, such as mechanized loop testing (MLT) data. In another example, the different data source may include a set of characteristic data corresponding to a group of loops including the local loop. The characteristic data allows estimates to be made for the particular local loop being analyzed. For example, weighted averages could be used to estimate a description for the loop. Further, in another example, a geographic system may supply data. The geographic system could be a geographical information system (GIS) that uses a follow the road routine to estimate distances.

Further, in carrying out the present invention, a method for qualifying a local loop for a digital subscriber line service is provided. The loop has a provider end and a customer end. The method comprises determining a provider end to customer end path. The end to end path identifies the loop on an individual basis with respect to a plurality of other loops. The method further comprises determining a set of loop description data, identifying a state of the set of loop description data, and estimating an insertion loss. The loop description data corresponds to the end to end path of the local loop. The insertion loss is based on the set of loop description data and is further based on a different data source as dictated by the state of the set of loop description data. That is, loop description data is for the individual loop, not an aggregate. Further, multiple information sources are used, as required.

In some embodiments, the method further comprises determining a qualification result based on the insertion loss. In a suitable implementation, the insertion loss is estimated in accordance with carrierless amplitude phase (CAP) line encoding. In some embodiments, the method further comprises selecting an average frequency for CAP line encoding, and estimating the insertion loss for the local loop at the average frequency. The average frequency may be, for example, about 196 kHz kilohertz. In some embodiments, the method further comprises estimating an available bandwidth based on the insertion loss.

The advantages associated with embodiments of the present invention are numerous. For example, embodiments of the present invention operate to perform real-time analysis of customer loops that generates responses indicating if the loop qualifies or not, and if it does qualify, at what estimated maximum bandwidth. Embodiments of the present invention have solved the problem of analysis of loops at the individual loop level, as opposed to the higher, aggregate level approach that is used by the prior art. In a preferred implementation, an embodiment of the present invention provides a web based interfaced to qualify customer loops based on analysis of stored loop data acquired from various data sources.

The above object and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
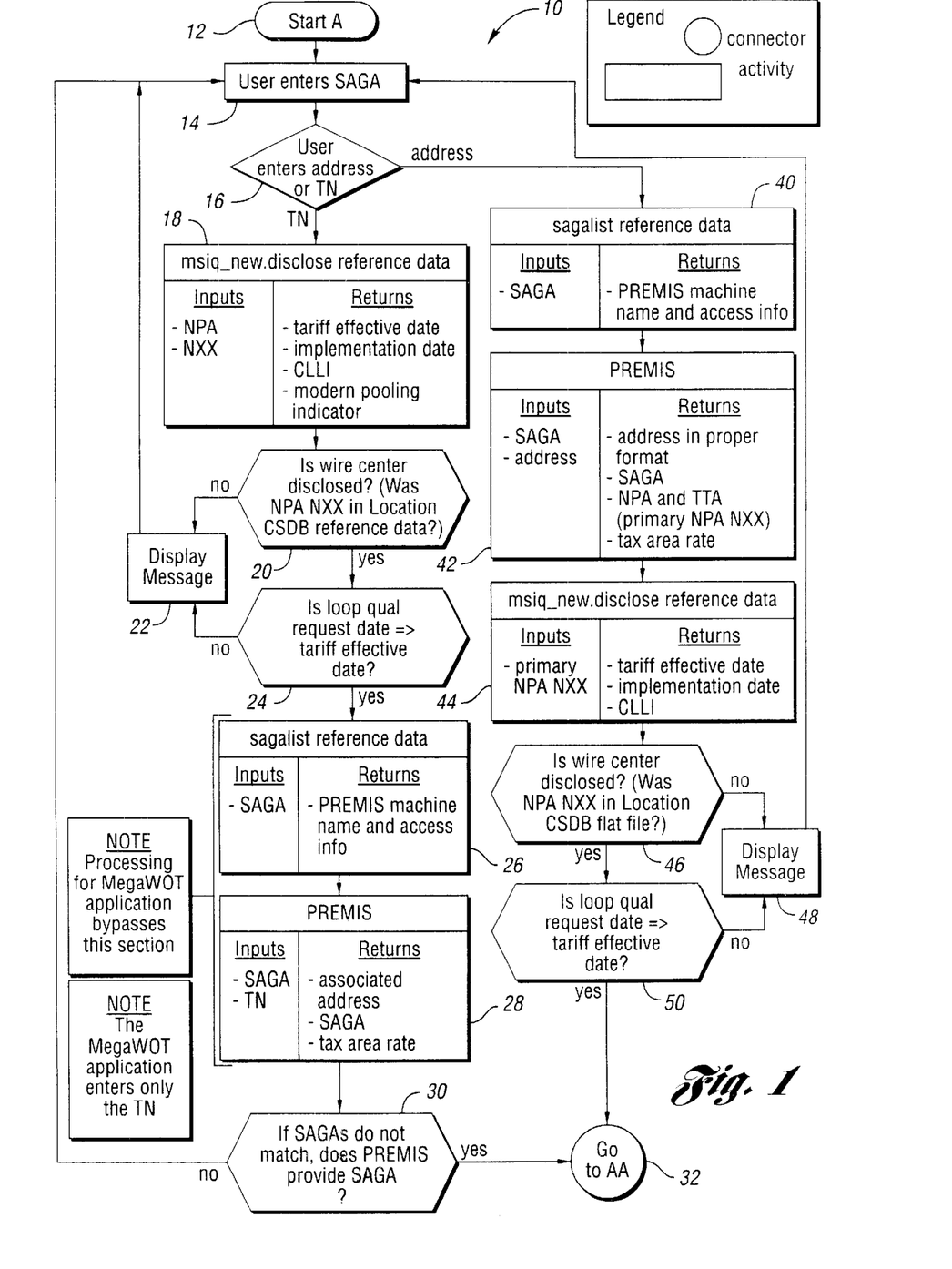
FIGS. 1–4, together, are a block diagram illustrating a method for qualifying a local loop in a preferred embodiment of the present invention.

With reference to FIG. 1, a block diagram illustrating a preferred embodiment of the loop qualification method, system, and tool is generally indicated at 10. Flow starts at block 12, through process block 14, to decision block 16. Although the implementation described herein is a web based method, wherein the system is accessible to a customer or support worker through a web based interface, embodiments of the present invention are readily applicable to other applications that may use a different interface, such as a telephone interface. At decision block 16, an address or telephone number is used to identify, and prefereably authenticate, the customer. When a telephone number is used as the customer identifier, flow proceeds to blocks 18, 20, 22, 24. At block 18, the system checks for a valid tariff for the customer loop. At block 22, it is checked to make sure that the wire center has been disclosed. At block 24, it is verified that the loop qualification requested is on or after the tariff effective date. Further, at blocks 26, 28, it is checked to see that the digital subscriber line access multiplexor (DSLAM) is ready and implemented at the location of the customer local loop.

On the other hand, when an address is used to identify the customer, flow proceeds to blocks 40, 42, 44. Once it is confirmed that there is a valid tariff, flow proceeds to blocks 46, 48, 50, where it is checked to see if the wire center has been disclosed and it is confirmed that the loop qualification request date did not precede the tariff effective date.

Of course, there are many ways to authenticate the customer and check preliminary conditions prior to qualifying the loop. It is appreciated that those steps shown in FIG. 1 (confirm valid tariff, verify wire center disclosure, check DSLAM) may be exemplary. Once the preliminary conditions have been checked in any suitable fashion, flow proceeds to connector 32.

Figure 2:
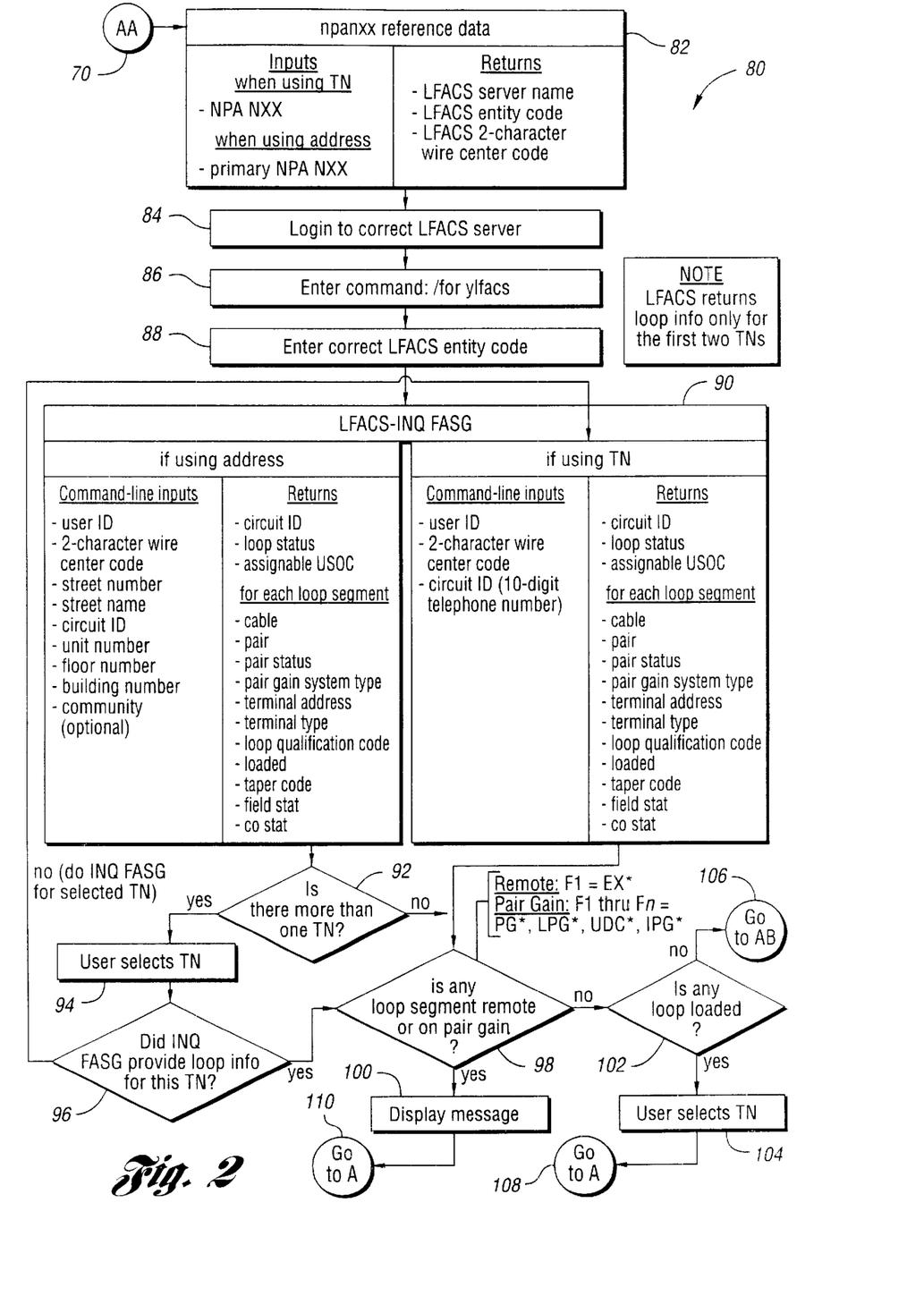

Continuing, with reference to FIG. 2, flow proceeds at connector 70. At block 82, an information source is determined for gathering the end to end path information for the local loop. In a suitable implementation that the inventors have tested, the information source for end to end loop information is a loop facilities assignment and control (LFACS) system. Such a system is used by US West, and of course, embodiments of the present invention may use other systems that are equivalent or that provide end to end loop information in any acceptable way.

In FIG. 2, generally indicated at 80, cable/pair path information is gathered. At blocks 84, 86, 88, LFACS is entered. At block 90, provider end to customer end path (A to Z path) information for the local loop is determined. The determined path identifies the loop on an individual basis with respect to a plurality of other loops. At blocks 92, 94, 96, path information may be determined for more than one loop in a single pass with the loop qualification tool.

Once end to end path identifying information has been determined for the loop, on an individual basis with respect to the other loops, additional conditions are checked at decision blocks 98 and 102. A message is displayed (block 100) if any segments of the end to end path, as indicated by LFACS, are on pair gain. Pair gain is when multiple voice lines are multiplexed onto to a number of physical lines that is less than the number of conversations. Similarly, if any loop is loaded, an appropriate message is displayed at block 104. For loaded loops and loops on pair gain, connectors 108 and 110, respectively, end the qualification test. Generally, pair gain and inductive loaded loops do not qualify for DSL. Otherwise, flow proceeds as indicated by connector 106. The loaded loop generally does not qualify because the inductive loading substantially affects frequency response at DSL frequencies. The loop connected to the pair gain could be qualified by avoiding the pair gain with, for example, a POTS splitter and DSLAM connection.

Figure 3:
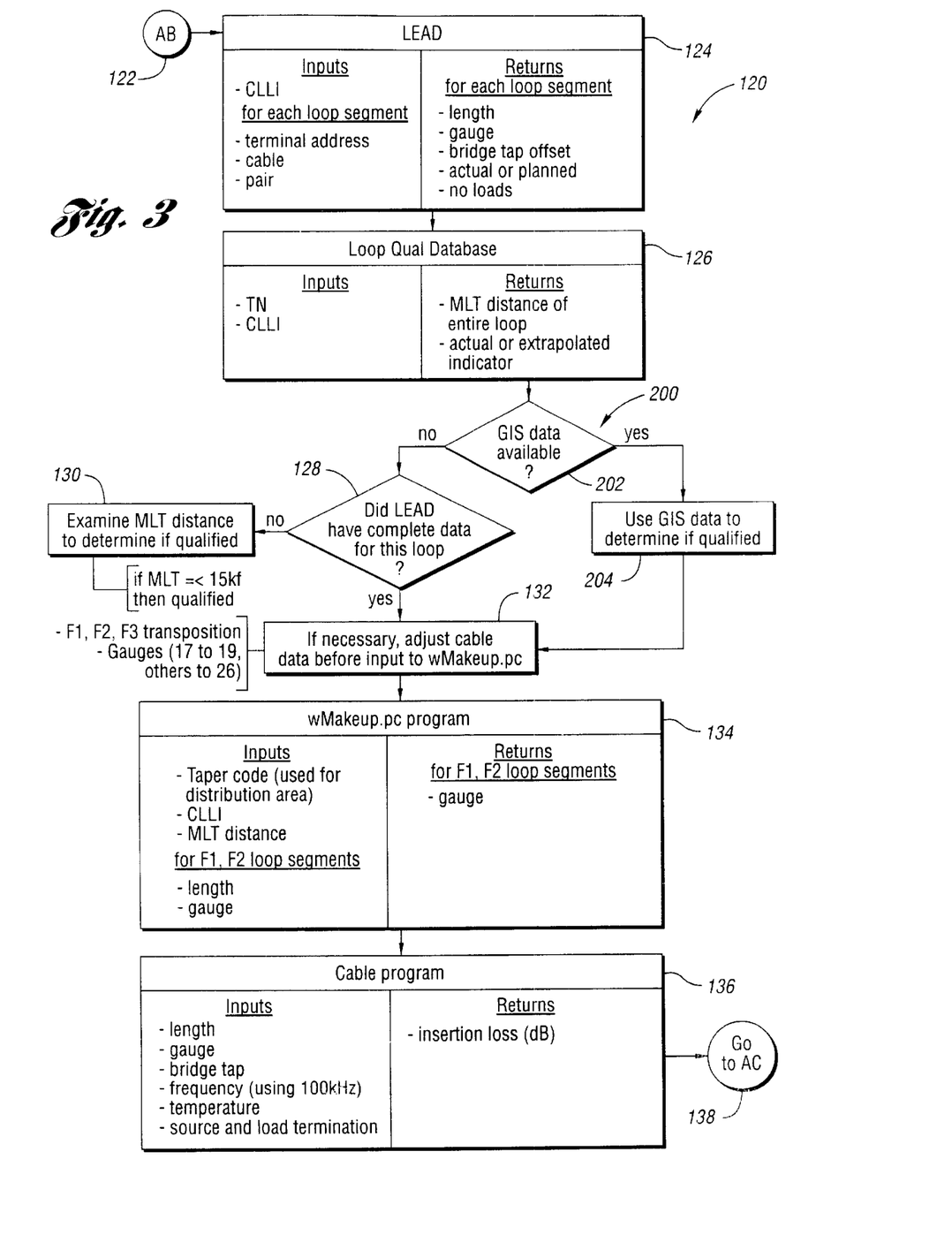

In FIG. 3, at connector 122, flow proceeds to blocks 124, 126. As generally indicated at 120, once the end to end identifying path has been determined for the individual loop, a set of loop description data is determined. The description data corresponds to the end to end path of the local loop. The descriptive data may include, for example, wire gauge information, bridged tap information, segment information, or load coil information. Of course, other information may be included in the descriptive data, and the set of descriptive data need not include all of the mentioned items. That is, the end to end path describes the geographic path, while the descriptive data describes the wire as it follows the path.

Generally, the descriptive data kept by telephone companies are usually quite conservative. Further, some of the descriptive data kept by a telephone company are identified as actual data, while others are identified as planned data. That is, for some loops, information was entered into records after the actual loops had been wired and indicated the actual wiring. For other loops, the data was entered prior to the actual wiring of the loops but (indicated the wiring plan). Sometimes, information items in the descriptive data record are missing.

When the description information is identified as actual data, that data is sufficient to determine a qualification test result for the local loop. When the data is planned data, the description information alone is not enough to accurately determine line qualification. Preferably, when more information is needed because the data is planned data, as generally indicated at 200, decision block 202 checks to see if Geographic Information System (GIS) data is available. If so, at block 204, GIS data is used during subsequent processing to determine if the particular local loop is qualified. Otherwise, flow proceeds to decision block 128. At block 128, it is checked to see if the descriptive data is complete. If the descriptive data said is not complete (critical items missing), available mechanized loop test (MLT) results are examined to determine if the customer is qualified. For example, if the loop test estimated a loop length of less than 15,000 feet, a result of qualified could be returned from the loop qualification tool.

In the general case, the descriptive data includes at least some planned data, and it is necessary to use a further source of information (example, GIS and/or MLT) in order to determine loop qualifications. That is, embodiments of the present invention, in addition to advantageously determining loop qualification for loops identified on an individual basis, use a plurality of information sources, as appropriate. Additional information may be in the form of MLT data (or other whole loop length test data), GIS data (or other partial loop length data), or any other form.

Although there has been an attempt in the past to use a single test result to determine line qualification, embodiments of the present invention advantageously combine information from multiple available information sources, made available with the present invention, to determine the loop qualification. At blocks 132, 134, 136 when the descriptive data is planned data, other data sources (preferably MLT and/or GIS as available, but could be different) are supplied to an algorithm in addition to the descriptive data. The algorithm weighs the additional data and planned data together to determine line qualification.

In some embodiments, the additional data includes results of a mechanized loop test (MLT). The MLT test data is based on comparative capacitance measurements for the wires of the pair. The MLT measures the entire loop. Further, different tests may be used in the alternative. The additional information source that is used when the data is planned data may include characteristic data for the local area. The characteristic data may be weighted averages of the data for other local loops. GIS data (or any equivalent data) should use a follow the road estimation routine rather than right angle or line of site to collect distances between cable termination points.

Further, in accordance with the present invention, determining the loop qualification test result involves estimating the insertion loss of the local loop. It is appreciated that planned data is supplemented with additional data that may take many forms. MLT data is one example and can estimate the full length of the loop. Other full loop tests or data may also be used. GIS data is another example and can estimate the length of certain portions of the loop. Other partial loop data may also be used. Further, a single additional data source (for example, MLT, GIS, etc.) or combination of sources (for example, MLT, GIS, etc.) may be used as required/available along with the path data.

Figure 4:
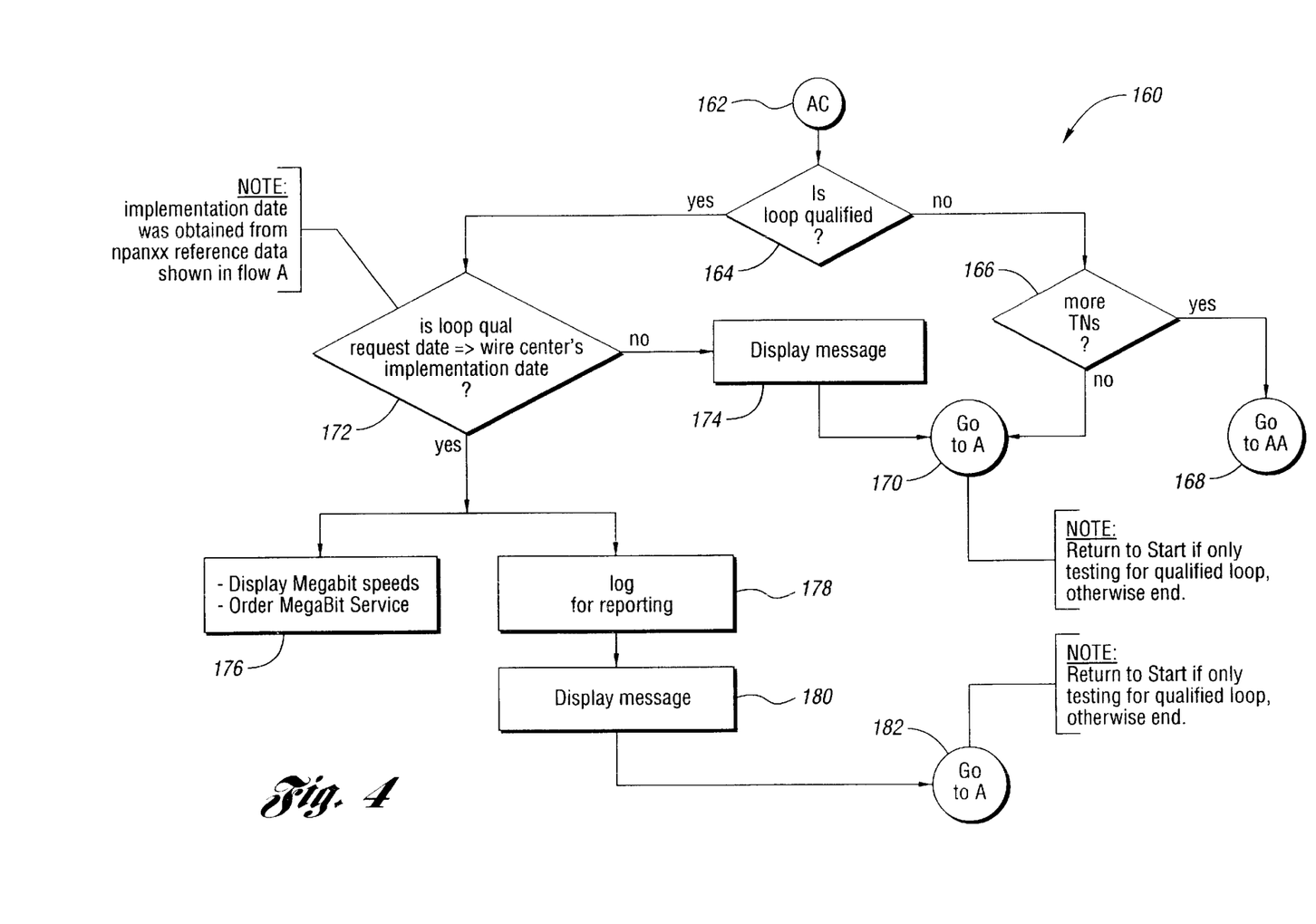

It is appreciated that the insertion loss is determined on an individual loop basis for the loop qualification test of the present invention. Further, the insertion loss is based on information from multiple sources, wherein the information is brought together, for the very first time, by embodiments of the present invention to provide loop qualification testing results with an accuracy that far out weighs the accuracy attainable with any of the information sources individually. With reference to FIG. 4, as generally indicated at 160, additional flow diagraming is illustrated. Connector 162 sends the flow onto decision block 164, where the algorithm result of where the loop was qualified is analyzed. When the loop is not qualified, the customer is given the option to test additional telephone numbers at block 166, sending flow onto connector 168. When the loop is qualified, at decision block 172, it is verified that the loop qualification result date does not precede the wire center's implementation date. When the wire center has not been implemented, flow proceeds to blocks 176, 178, 180. The customer may be informed that he or she qualifies, but the service is not yet available and may given the option to be notified in the future. Thereafter, flow proceeds to connector 182. On the other hand, at block 174, the customer may be informed that the loop is qualified and the service is available. Thereafter, flow proceeds to connector 170.

The inventors have found that the combined use of the different information sources, along with taking the extra steps to qualify loops on an individual basis (as opposed to qualifying groups of loops from the central office to the cross box), provides a successful loop qualification test that is far different than any existing loop qualification test. The inventors have found that analysis of the individual loop attributes has resulted in the loop qualification rate improving from 13 percent to 40 percent with a less than 2 percent false-positive rate. In a suitable implementation, the loop qualification tool of the present invention is implemented as a web based application, that interfaces with the customer at a web based interface to qualify customer loops based on analysis of stored loop attributes acquired from LFACS, LEIS/LEAD, and MLT, in addition to preferred embodiments using GIS information.

Further, in preferred embodiments of the present invention that determine an insertion loss for the local loop, bandwidth may be estimated based on the insertion loss. For example, different decibel ranges of insertion loss could correspond to different bandwidth available to the customer. And lastly, suitable embodiments of the present invention, after determining that a loop is qualified, check the DSLAM port capacity local to the customer to determine if a port is available. When a port is available, the customer can be told that service is immediately available. Otherwise, the customer may be informed that service will be available as soon as an extra port becomes available (or is added) to the DSLAM.

Figure 5:
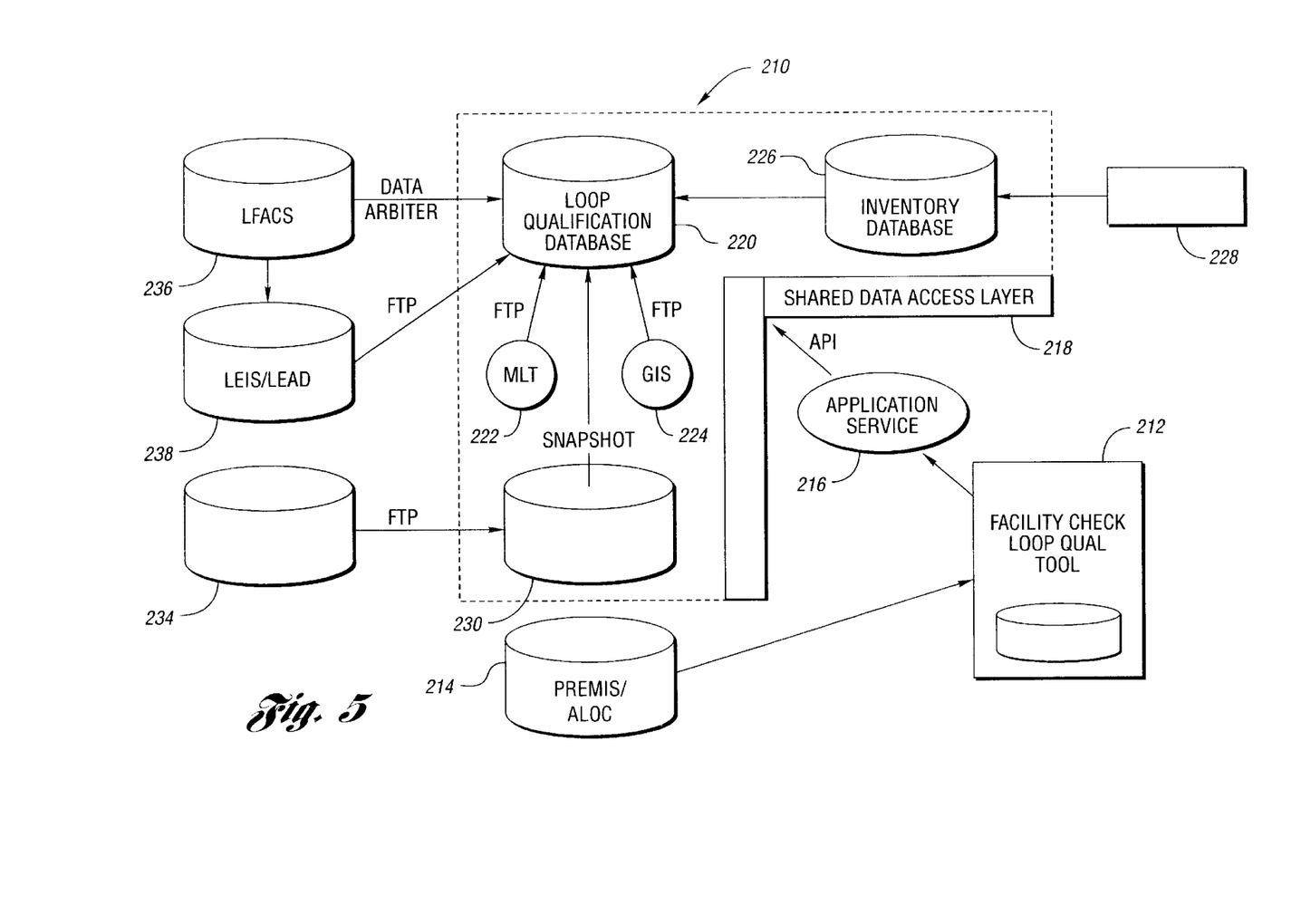
FIG. 5 is a system block diagram for the present invention, in a preferred implementation.

In FIG. 5, an exemplary implementation of the present invention that is generally consistent with the block diagrams of FIGS. 1–4, is generally indicated at 210. The loop qualification tool is invoked at block 212. Some initial information (see portions of FIG. 1) is retrieved from database 214. Application service 216 interfaces with a shared data access layer 218. The loop qualification tool qualifies loops on an individual basis based on information from a plurality of data sources, as required. In a suitable implementation, a loop qualification database 220 holds MLT data 222 and GIS data 224. Information preferably is also available from additional databases and sources 226, 228, 230, 234. Further, in the implementation illustrated, cable/pair path information is obtained from database 236, while the descriptive information for the loop is obtained from database 238. Of course, it is appreciated that the system diagram shown in FIG. 5 is an exemplary implementation of the present invention, and the system architecture may vary as is appreciated of those skilled in the art of knowledge systems and loop qualification.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for qualifying a local loop for a digital subscriber line service, the loop having a provider end and a customer end, the method comprising:

determining a provider end to customer end path for the local loop, the end to end path identifying the loop on an individual basis with respect to a plurality of other loops;

determining a set of loop description data corresponding to the end to end path of the local loop by accessing a physical description database having records indicating the loop description data, wherein the loop description data for a loop include an identifier indicating a state from a plurality of states including an actual state and a planned state;

identifying a state of the set of loop description data based on the identifier; and determining a qualification result for the local loop, the result being based on the set of loop description data and being further based on a different data source when the identifier indicates a planned state.

2. The method of claim 1 wherein determining the provider end to customer end path further comprises:

accessing a loop facilities assignment system, the system having records indicating the end to end paths for loops.

3. The method of claim 1 wherein the loop description data for a loop include wire gauge information on an individual loop basis.

4. The method of claim 1 wherein the loop description data for a loop include bridged tap information on an individual loop basis.

5. The method of claim 1 wherein the loop description data for a loop include segment information on an individual loop basis.

6. The method of claim 1 wherein the loop description data for a loop include load coil information on an individual loop basis.

7. The method of claim 1 wherein the different data source includes a set of loop test data corresponding to the end to end path of the local loop.

8. The method of claim 7 wherein the set of loop test data is based on at least one capacitance measurement at the loop.

9. The method of claim 1 wherein the different data source includes a set of characteristic data corresponding to a group of loops including the local loop.

10. The method of claim 1 wherein the different data source includes a geographical system that uses a follow the road routine to estimate distances.

11. The method of claim 1 wherein determining a qualification result further comprises:

determining the qualification result based on an insertion loss.

12. The method of claim 11 wherein the insertion loss is estimated in accordance with carrierless amplitude phase (CAP) line encoding.

13. The method of claim 12 further comprising:
- selecting an average frequency for carrierless amplitude phase line encoding; and
- estimating the insertion loss for the local loop at the average frequency.

14. The method of claim 13 wherein the average frequency is about 196 kHz.

15. The method of claim 13 wherein determining the result further comprises:
- estimating an available bandwidth based on the insertion loss.

* * * * *